United States Patent Office 3,592,849
Patented July 13, 1971

---

3,592,849
DECOMPOSITION OF ANHYDRIDES TO ISOMERIC ACIDS
Donald M. Fenton, Anaheim, Calif., assignor to Union Oil Company of California, Los Angeles, Calif.
No Drawing. Filed Jan. 21, 1969, Ser. No. 792,772
Int. Cl. C07c *51/00, 53/22*
U.S. Cl. 260—540
8 Claims

ABSTRACT OF THE DISCLOSURE

A process for the preparation of acids from their anhydrides with isomerization of the acid by contacting the anhydride with a catalyst comprising a complex of a Group VIII noble metal and a biphyllic ligand at a temperature between 150° C. and 250° C. and at a pressure sufficient to maintain liquid phase reaction conditions. The product acids are useful as intermediates for a variety of products including detergents.

DESCRIPTION OF THE INVENTION

The invention relates to the decomposition and isomerization of carboxylic acid anhydrides to form carboxylic acids. It has been discovered that when an anhydride, e.g., isobutyric anhydride, is contacted with a Group VIII noble metal in complex with a biphyllic ligand such as triphenylphosphine, the anhydride is decomposed and isomerized to form an alkanoic acid, e.g., normal butyric acid, an olefin and carbon monoxide. In similar fashion, a straight-chain anhydride may be converted to a branched-chain acid. The reaction proceeds according to the following typical equation:

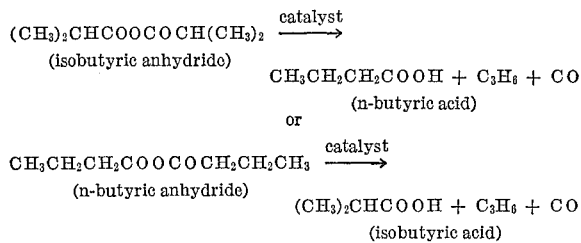

As is apparent from the above reactions, either the straight-chain or the branched-chain acid can be formed from the branched-chain or straight-chain anhydride, respectively. The straight-chain acids are the most useful and most valuable products and therefore the invention has the greatest utility in decomposing branched-chain anhydrides to form the straight-chain acid.

The process of this invention can be utilized to upgrade branched-chain acids to the more valuable straight-chain acids. In hydrocarboxylation reactions, an isomeric mixture of straight and branched chained acids is produced. The more valuable straight chain acids can be separated from the mixture and the branched chain acids can then be dehydrated to their anhydrides for decomposition and isomerization by the method of this invention. In other applications, the hydrocarboxylation can be performed in an acid solvent to yield acid anhydrides directly. The branched chain anhydride may be separated from the straight chain anhydride by conventional means (e.g., distillation) and then decomposed over the catalyst of this invention to form the straight chain acid, an olefin and carbon monoxide. The olefin and carbon monoxide can be recycled to the hydrocarboxylation zone where the acid is converted to the anhydride. Hence, ultimate yields of straight chain acids can be significantly improved by the process of this invention.

The anhydrides treated in accordance with this invention comprise anhydrides of straight-chain and branched-chain acids having 4 to about 18 carbons, preferably 4 to about 12 carbons, and having at least one hydrogen on the carbon that is in the beta position to the carboxyl group. Anhydrides of the following acids having at least 4 carbons can be treated by the method of this invention:

wherein R is hydrogen or the same or different alkyl, or cycloalkyl, having 1 to about 15 carbons, at least one being alkyl or cycloalkyl. Preferably at least one R is alkyl having 1 to about 8 carbons, e.g., methy, ethyl, propyl, isopropyl, amyl, hexyl, isobutyl, 2-methylhexyl, etc., preferably the anhydrides of the above acids are symmetrical and most preferably the anhydride is a symmetrical saturated aliphatic anhydride of an acid having 4 to about 16 carbons.

Examples of useful anhydrides are isobutyric anhydride, n-butyric anhydride, 2-methylbutyric anhydride, valeric anhydride, 3-ethylbutyric anhydride, 3-ethyl-2-methylbutyric anhydride, 2-methylvaleric anhydride, caproic anhydride, 2-ethylhexanoic anhydride, 2-ethylpentanoic anhydride, enanthylic anhydride, 2-isobutylhexanoic anhydride, 2-methylheptanoic anhydride, caprylic anhydride, pelargonic anhydride, capric anhydride, 4-butylhexanoic anhydride, undecylic anhydride, 2-butylheptanoic anhydride, lauric anhydride, 2-pentylheptanoic anhydride, 3-methylnonanoic anhydride, myristic anhydride, palmitic anhydride, stearic anhydride, etc. Examples of anhydrides of cycloalkyl bearing acids include cyclohexylbutyric anhydride, cyclopentylvaleric anhydride, methylcyclopentylhexanoic anhydride, cycloheptylheptanoic anhydride, etc. Mixed anhydrides wherein one of the components is derived from the above-defined class of acids are also included and the other component need not contain a hydrogen in the beta position and may be derived from the class of acid having the formula:

wherein R is alkyl, cycloalkyl, having 1 to 17 carbons, e.g., methyl, butyl, isobutyl, pentyl, nonyl, cyclohexyl, cycononyl, etc. Suitable mixed anhydrides are propionic acid anhydride with n-butyric acid, acetic acid anhydride with caproic acid, acetic acid with lauric acid, propionic acid anhydride with valeric acid, acidic acid anhydride with cyclohexylbutyric acid, enanthylic acid anhydride with stearic acid, acetic acid anhydride with palmitic acid, etc.

The catalyst of the invention comprises a Group VIII noble metal in complex with a biphyllic ligand. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

wherein E is trivalent phosphorus, arsenic, antimony or bismuth; and wherein R is the same or different alkyl, cycloalkyl, or aryl having 1 to about 18 carbons; examples of which are methyl, butyl, nonyl, cyclohexyl, cyclodecyl, phenyl, tolyl, xylyl, tetramethylphenyl, etc. Preferably at least one R is aryl, e.g., phenyl, tolyl, xylyl, etc. having 6 to 9 carbons and, most preferably, the ligand is triaryl.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)phosphine, ethyldiphenylphosphine, phenylditolylphosphine, xylyldiphenylarsine, tolyldi(m-xylyl)stibine, trixylylphosphine, trixylylarsine, trixylylstibine, cyclopentyldixylylstibine, dioctylphenylphosphine, tridurylphosphine, trixylylbismuthine, etc. Of the aforementioned, the aryl phosphines and particularly the triarylphosphines (e.g., triphenylphosphine) are preferred because of their greater activity.

The Group VIII noble metal may be ruthenium, rhodium, palladium, osmium, iridium or platinum. A catalytic quantity of the metal is added (e.g., 0.002 to 2 percent of the reaction medium) and the metal may be added as a soluble salt, a carbonyl, a hydride or as a chelate.

The Group VIII metal may be complexed with the above-described biphyllic ligand before being introduced into the reaction medium or the complex may be formed "in situ" by simply adding a compound of the metal and the biphyllic ligand directly into the reaction medium. In either case, it is generally preferable that the quantity of biphyllic ligand be in excess (e.g., 10 to 300 percent) of that stoichiometrically required to form a complex with the Group VIII metal. The complex has from 1 to about 5 moles of biphyllic ligand per atom of the metal and other components such as hydride, or soluble anions such as sulfate, nitrate, $C_1$-$C_5$ carboxylates (e.g., acetate, propionate, isobutyrate, valerate, etc.), halide, etc. may be but need not be included in the complex catalyst of this invention. These components may be incorporated in the catalyst by the formation of the catalyst complex from a Group VIII metal salt of the indicated anions. Preferably the complex includes at least one halide, e.g., chloride, iodide or bromide or a carboxylate since these ligands improve the activity of the catalyst.

Examples of suitable sources of the noble metals are as follows: iridium carbonyl chloride, iridium carbonyl hydride, iridium carbonyl, iridium tetrabromide, iridium tribromide, iridium trifluoride, iridium trichloride, osmium trichloride, chloroosmic acid, palladium hydride, palladous chloride, palladous cyanide, palladous iodide, osmium isopropionate, iridium valerate, palladium acetate, palladous nitrate, platinic acid, platinous iodide, palladium cyanide, sodium hexachloroplatinate, potassium trichloro(ethylene)platinate(II), chloropentaaminorhodium(III)chloride, rhodium dicarbonyl chloride dimer, rhodium nitrate, rhodium trichloride, rhodium carbonyl hydride, ruthenium trichloride, tetraaminorutheniumhydroxychloro chloride; etc.

The reaction is performed under liquid phase conditions and can be performed in the presence of a liquid organic solvent having a solvency for the reactants and the catalyst and inert to the reactants and/or products under the reaction conditions. Suitable solvents include, for example, hydrocarbons, ketones and ethers. Examples of the foregoing are pentane, hexane, heptane, isooctane, naphtha, cyclohexane, indane, benzene, toluene, xylene, tetralin, acetone, diethyl ketone, diisopropyl ketone, methyl-n-amyl ketone, cyclohexanone, diisopropyl ether, di-n-butyl ether, ethylene glycol diisobutyl ether, methyl o-tolyl ether and diethyl ether. The reaction can also be performed in the absence of such liquids by conducting the reaction in an excess (2–200 times that stoichiometrically required) of the reactant anhydride. This can be accomplished for example in a batch process by terminating the reaction prior to most of the anhydride being decomposed or for example in the continuous process by adding sufficient reactant anhydride to maintain the desired high level of anhydride. The decomposition can also be conducted in an excess of the product acid.

The reaction is performed at relatively low temperatures from about 100° to 400° C.; preferably 150° to 250° C.; and at low pressures, e.g., 1–50 atmospheres, preferably 1–10 atmospheres (all pressures herein are on an absolute basis), sufficient to maintain liquid reaction conditions. The decomposition releases carbon monoxide and therefore pressure will increase with time. Suitable pressure controlling devices may be used to maintain a constant pressure. The gas phase can comprise chiefly the generated carbon monoxide; however, an inert gas such as nitrogen may also be introduced into the reaction zone in order to provide the necessary pressure and to reduce the partial pressure of carbon monoxide to a low value, e.g., from 0.1 to 50 percent of the total pressure. The necessary heat can be supplied by circulating part of the medium through a heater in indirect heat exchange with steam or with other suitable heating fluids.

The reaction may be carried out in a batch or in a continuous process. In the batch process, the reaction is continued until a substantial amount or all of the anhydride has decomposed. The carbon monoxide and olefin byproducts may be recovered and recycled to the hydrocarboxylation reaction medium. The product straight chain or branched chain acid, reactant anhydride, catalyst, and solvent, if any, are separated by any conventional means, e.g., distillation. The unreacted anhydride, catalyst and solvent, if any, are recycled to the decomposition reaction medium. In the continuous process, anhydride is continuously fed into the decomposer with carbon monoxide and gaseous olefin, if any, being continuosly withdrawn as a vapor effluent. A slipstream comprising a liquid olefin byproduct, if any, unreacted anhydride, catalyst and any solvent that may be present is continuously withdrawn and the ingredients separated by conventional means such as distillation. The anhydride, catalyst and solvent can be recycled to the decomposer and the olefin can be recycled to the hydrocarboxylation reaction zone.

The following examples will illustrate the practice of the invention, however, the invention should not be limited to the processes described therein:

EXAMPLE 1

Into a bomb were introduced 50 milliliters of isobutyric anhydride, ½ gram palladium chloride and 3 grams of triphenylphosphine. The bomb was purged with nitrogen, pressured with carbon monoxide to 8 atmospheres and heated to and maintained at 200° C. for about 6 hours. The bomb was then cooled, depressured and opened. The products were analyzed by gas chromatography to reveal that 9.5 grams of n-butyric acid and some isobutyric acid were formed in the process.

When the reaction is repeated in the presence of 150 milliliters heptane as an inert reaction solvent, similar results are obtained.

EXAMPLE 2

Into a bomb were introduced 60 milliliters of n-butyric anhydride, 1 gram palladium chloride and 6 grams triphenylphosphine. The bomb was purged with nitrogen, pressured with nitrogen to 8 atmospheres, and heated to and maintained at 200° C. for about 6 hours. The bomb was then cooled, depressured and opened. The products were analyzed by gas chromatography to reveal that about 13 grams of isobutyric acid and some n-butyric acid were formed in the process.

The preceding examples illustrate the best mode of practice of the invention presently contemplated. Other anhydrides, solvents or catalyst complexes described hereinabove can readily be substituted for those illustrated without substantial changes to the illustrated mode of practice.

I claim:

1. The process of converting an anhydride to the isomeric acid of the anhydride comprising contacting an anhydride of an acid having 4 to about 18 carbons, having at least one hydrogen in the carbon that is in the beta position to the carboxyl group and having the formula:

$$RRHCCR_2COOH$$

wherein R is hydrogen or the same or different alkyl or cycloalkyl having 1 to about 15 carbons, with a Group VIII noble metal in complex with a biphyllic ligand having the formula:

$$E(R)_3$$

wherein E is trivalent phosphorus, arsenic, antimony or bismuth; and wherein R is the same or different alkyl, cycloalkyl or aryl having 1 to about 18 carbons; at a temperature between about 100° and 400° C. and at a pressure of 1–50 atmospheres sufficient to maintain liquid phase reaction conditions.

2. The process of claim 1 wherein the Group VIII noble metal is palladium.

3. The process of claim 1 wherein the biphyllic ligand is a triarylphosphine and wherein R has 6 to about 9 carbons.

4. The process of claim 3 wherein said ligand is triphenylphosphine.

5. The process of claim 1 wherein the anhydride is a symmetrical saturated aliphatic anhydride of an acid having from 4 to about 16 carbons.

6. The process of claim 5 wherein the Group VIII noble metal is palladium.

7. The process of claim 5 wherein the anhydride is branched-chain.

8. The process of claim 6 wherein the anhydride is isobutyric anhydride or normal butyric anhydride.

References Cited

Migrdichian, Org. Synthesis, 1957, pp. 294–295.

JAMES A. PATTEN, Primary Examiner

V. GARNER, Assistant Examiner

U.S. Cl. X.R.

260—413, 514